(12) United States Patent
Casalegno

(10) Patent No.: US 11,201,541 B2
(45) Date of Patent: Dec. 14, 2021

(54) POWER CONVERTER AND METHOD FOR OPERATING A POWER CONVERTER

(71) Applicant: BRUSA Elektronik AG, Sennwald (CH)

(72) Inventor: Massimo Casalegno, Sennwald (CH)

(73) Assignee: BRUSA HYPOWER AG, Sennwald (CH)

( * ) Notice: Subject to any disclaimer, the term of this patent is extended or adjusted under 35 U.S.C. 154(b) by 0 days.

(21) Appl. No.: 16/922,372

(22) Filed: Jul. 7, 2020

(65) Prior Publication Data
US 2021/0028694 A1    Jan. 28, 2021

(30) Foreign Application Priority Data

Jul. 26, 2019 (CH) ..................................... 00961/19

(51) Int. Cl.
*H02M 1/42* (2007.01)
*H02M 7/04* (2006.01)
(Continued)

(52) U.S. Cl.
CPC ......... *H02M 1/4225* (2013.01); *H02M 1/007* (2021.05); *H02M 1/0067* (2021.05); *H02M 1/0083* (2021.05); *H02M 1/4216* (2013.01); *H02M 1/4258* (2013.01); *H02M 3/33569* (2013.01); *H02M 7/04* (2013.01)

(58) Field of Classification Search
CPC ....... H02M 1/0067; H02M 2001/0067; H02M 2001/007; H02M 1/007; H02M 1/0083; H02M 2001/0083; H02M 7/17; H02M 7/23; H02M 1/4225; H02M 1/4216;
(Continued)

(56) References Cited

U.S. PATENT DOCUMENTS 10,270,273 B2 * 4/2019 Woo ..................... H02M 7/23
10,784,704 B2 * 9/2020 Jang .................... H02J 7/02
(Continued)

FOREIGN PATENT DOCUMENTS

EP      3 242 382      11/2017
WO      2018/002852    1/2018

OTHER PUBLICATIONS

Switzerland Search Report dated Nov. 25, 2019, Application No. 9612019, 3 pages.
(Continued)

*Primary Examiner* — Gary L Laxton
(74) *Attorney, Agent, or Firm* — Rankin, Hill & Clark LLP

(57) ABSTRACT

A power converter includes at least three booster modules for transferring power at least from an AC input side to a DC output side. Each booster module has a galvanically separated input and output, and can be operated as a power factor correction module. The input of a first booster module is connected to the input side, and its output is connected to the output side for providing a first output current to the output side. The input of a second booster module is connected to the input side, and its output is connected to a buffer capacitor for providing a second output current to the buffer capacitor. The input of a third booster module is connected to the buffer capacitor and its output is connected to the output side for providing a third output current to the output side.

11 Claims, 2 Drawing Sheets

(51) Int. Cl.
*H02M 3/335* (2006.01)
*H02M 1/00* (2006.01)

(58) Field of Classification Search
CPC ............. H02M 3/335; H02M 3/33569; H02M 3/33576; H02M 7/04; H02M 7/21; H02M 7/217
See application file for complete search history.

(56) References Cited

U.S. PATENT DOCUMENTS

| | | |
|---|---|---|
| 2011/0261591 A1 | 10/2011 | Krause |
| 2012/0120697 A1 | 5/2012 | Cuk |
| 2015/0162823 A1 | 6/2015 | Partridge |
| 2020/0052575 A1* | 2/2020 | Wang ..................... H02M 7/21 |

OTHER PUBLICATIONS

Juncheng Lu et al., "Device and System-Level Transient Analysis in a Modular Designed Sub-MW EV Fast Charging Station Using Hybrid GaN HEMTs + Si MOSFETs", IEEE Journal of Emerging and Selected Topics in Power Electronics, Mar. 2019, vol. 7, No. 1, pp. 143-156, cited in Switzerland Search Report.

Montie Alves Vitorino et al., "Low-Frequency Power Decoupling in Single-Phase Applications: A Comprehensive Overview", IEEE Transactions on Power Electronics, Apr. 2017, vol. 32, No. 4, pp. 2892-2912; Cited in Switzerland Search Report.

\* cited by examiner

POWER CONVERTER AND METHOD FOR OPERATING A POWER CONVERTER

BACKGROUND OF THE INVENTION

Field of the Invention

The invention relates to the field of electronic power converters. It relates to a power converter and a method for operating a power converter

Description of Related Art

AC-DC converters, for example for on board chargers (OBC) for electrical vehicles, typically include two stages:
- three power factor correction (PFC) modules that control their respective input currents in a way that they have a sinusoidal waveform and are in phase with their respective input voltages, this in turn being embedded in a slow control loop for adjusting the PFC output voltage; and
- a galvanically isolated DC-DC converter with a slow control loop that adjusts an output current, used e.g. for charging a battery, or an output voltage, e.g. when the battery is not connected.

Disadvantages of the current designs include:
Hardware complexity: On top of three PFC modules, one DC-DC module with a transformer must be designed. All these parts must be also driven by signals that also have to be generated and their levels adapted.
Software complexity: A total of three different control loops must be designed and optimized so that the whole system remains stable, with the additional difficulty of interactions between the control loops.
Electrical and thermal losses: Each switching stage has at least 3% loss, therefore, having a PFC followed by a DC-DC converter means that the loss will be 6% or worse.
Cost and risk of failure: The material expenditure is massive compared to the simplicity of the task to be implemented, that is just a battery charger.

US 2012/0120697 A1 discloses a three-phase isolated rectifier with PFC, with separate PFC modules connected to a three phase AC supply, with their DC sides connected in parallel.

US 2015/0162823 A1 shows PFC circuits with low total harmonic distortion.

WO 2018/002852 A1 discloses a converter with three conversion modules that can be operated in a 3-phase mode and a 1-phase mode. The outputs of the three conversion modules are connected in parallel. Each conversion module includes an indirect matrix converter, a transformer, a coupling inductor and an H-bridge switching arrangement. In the 1-phase mode, two of the conversion modules are operated to generate an output current, and in the third conversion module the indirect matrix converter is disabled and the H-bridge switching arrangement is operated as an active filter on the output side. The converter is complex and does not efficiently use the capacity of the components when in 1-phase mode.

SUMMARY OF THE INVENTION

It is therefore an object of the invention to create a power converter and a method for operating a power converter of the type mentioned initially, which overcomes at least one or more of the disadvantages mentioned above.

The power converter is for transferring power at least from an AC input side to a DC output side, the power converter including at least three Power Factor Correction (PFC) modules, a first booster module, second booster module and third booster module,
each booster module having a respective module input and module output, the module input and module output being galvanically separated,
wherein
each booster module being able to be operated as a power factor correction (PFC) module, for drawing a sinusoidal current at its respective module input,
wherein, in a configuration called series configuration,
the input of the first booster module is connected to the input side, and the output of the first booster module is connected to the output side for providing a first output current to the output side;
the input of the second booster module is connected to the input side, and the output of the second booster module is connected to a buffer capacitor for providing a second output current to the buffer capacitor;
the input of the third booster module is connected to the buffer capacitor and output of the third booster module is connected to the output side for providing a third output current to the output side.

With this topology, it becomes possible to compensate for a ripple in a total current at the output side by using a relatively small buffer capacitor. This again can be done by discharging the buffer capacitor nearly completely and then recharging it completely or nearly completely.

In embodiments, the buffer capacitor is other than a electrolyte capacitor. In embodiments, it is a film dielectric capacitor.

In embodiments, the power converter, and in particular a controller of the power converter, is configured to discharge the buffer capacitor to a voltage of less than 30% or less than 50% or less than 70% of the DC output voltage at the output side, in particular at each pulse of the third output current.

In the context of the present application, a booster module can be understood to be a universal booster module that can work both with an AC input as a PFC, and with a DC input as a voltage booster. A large range of topologies can be used, for example, flyback converters, H-bridge converters, etc.

A PFC can present an adjustable resistive load to the AC input side, while transferring the power absorbed from the AC input side directly to a possibly galvanically isolated DC output side. Transferring the power "directly" means that the PFC does not compensate or filter or smooth the power pulsation that occurs at the input side at twice the AC input fundamental frequency. Thus the PFC, and in this case the booster module does not include a smoothing capacitor that has a relevant influence at this frequency.

In embodiments, the at least three booster modules are free from a power storage element, in particular a capacitor, that is designed for smoothing current pulses arising at twice a fundamental frequency of an AC source the power converter is designed to be connected to. In other words, the booster modules either do not include any filter capacitors at all, or, if filter capacitors are present, their capacity is such that they block current components at twice the fundamental frequency of the AC frequency that the power converter is designed to operate at. Consequently, such capacitors do not exchange power and do not act for storing power at such frequencies.

In embodiments the at least three booster modules have similar, or, in particular, identical parameters.

In embodiments, the power converter includes a controller configured to
- control the first booster module to draw a sinusoidal current at its input;
- control the second booster module to draw a sinusoidal current at its input;
- control the third booster module to provide the third output current to complement the first output current so that the sum of the third and first output currents is at least approximately constant.

This can be implemented by controlling the third booster module that the deviation of the sum of the third and first output currents from a predetermined set point is minimised. "Predetermined" means that the set point is, for example, stored in the controller, or determined by a further, supervisory control loop, etc.

The controller thus can be configured to operate at least one of the booster modules (or universal booster modules) to work as a PFC and another one of the booster modules as an output current generator that compensates the output ripple of yet another booster module that is working as a PFC.

In embodiments, the power converter is reconfigurable, that is, it includes connections between the booster modules that can be switched, resulting in different topologies of the power converter. In addition to the topology described above, it can be reconfigured to have a configuration in which:
- the inputs of the three booster modules are separate from one another, and their outputs are connected in parallel to the output side.

In this configuration, called three-phase parallel configuration, the power converter can be operated in 3-phase mode, that is, transferring power from a three phase AC power source to the DC output side. The three inputs can be connected in either Delta or Y configuration to a three-phase AC source.

In embodiments, the power converter is reconfigurable to have a configuration in which
- the inputs of the three booster modules are connected in parallel to one another, and their outputs are connected in parallel to the output side.

In this configuration, called single-phase parallel configuration, the power converter can be operated in single-phase mode, that is, transferring power from a single-phase AC power source to the DC output side.

In embodiments, the power converter includes a controller configured to switch the connections between the booster modules, based on a charging current limit $I_{lim}$, a charging current set point value $I_{set}$, a maximum rated current of the power converter $I_{max}$ and a mains configuration (single-phase or three-phase) under which the power converter is operating
- to be connected in the three-phase parallel configuration in the case that the power converter is connected to a three-phase AC input side;
- to be connected in the series configuration, in the case that the power converter is connected to a single-phase AC input side, if the charging current limit $I_{lim}$ is less than two times the charging current set point value $I_{set}$ and if the charging current limit is less than four thirds of the maximum rated current $I_{max}$; and
- to be connected in the single-phase parallel configuration otherwise.

This allows the converter to automatically operate with the highest allowable charging power, depending on circumstances.

The method for controlling a power converter includes the steps of:
- controlling the first booster module to draw a sinusoidal current at its input;
- controlling the second booster module to draw a sinusoidal current at its input;
- controlling the third booster module to provide the third output current to complement the first output current so that the sum of the third and first output currents is at least approximately constant.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

Figure 1:
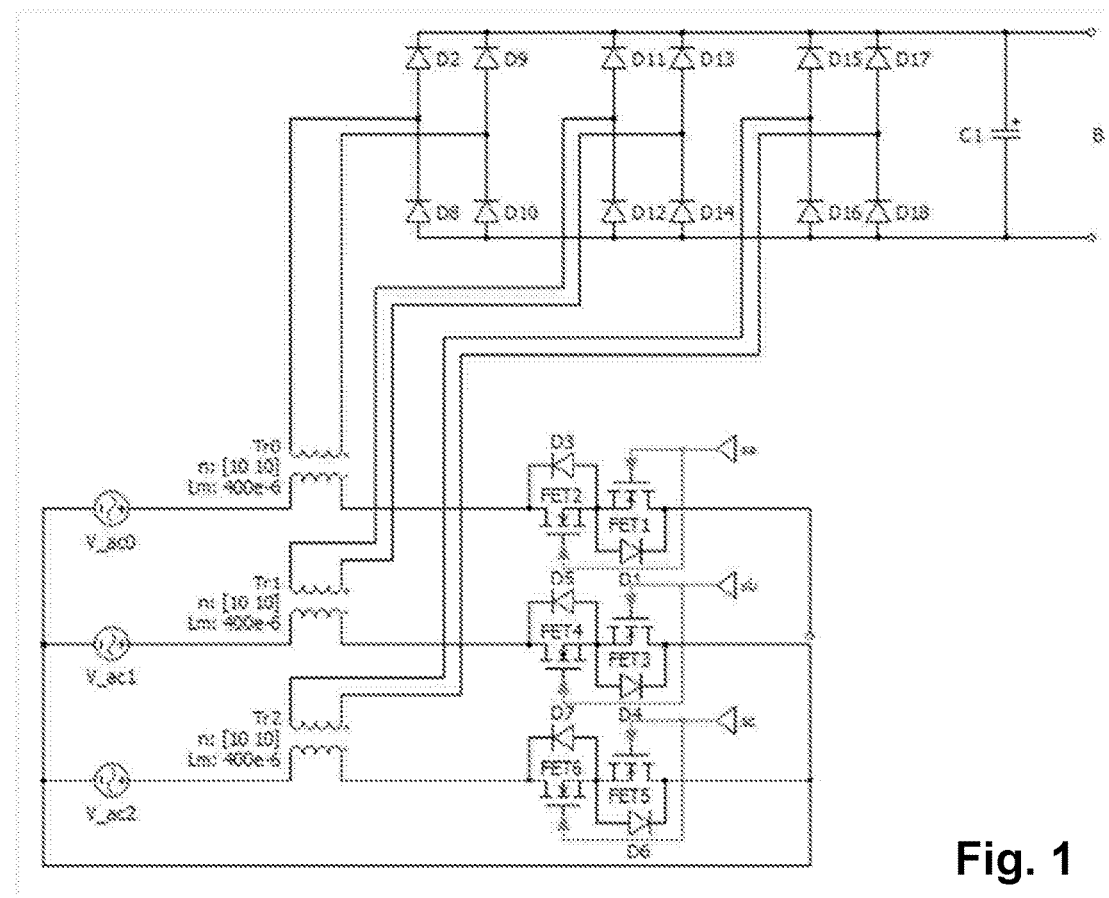
FIG. 1 a possible topology for implementing a galvanically isolated PFC.

The reference symbols used in the drawings, and their meanings, are listed in summary form in the list of reference symbols. In principle, identical parts are provided with the same reference symbols in the figures.

Figure 2:
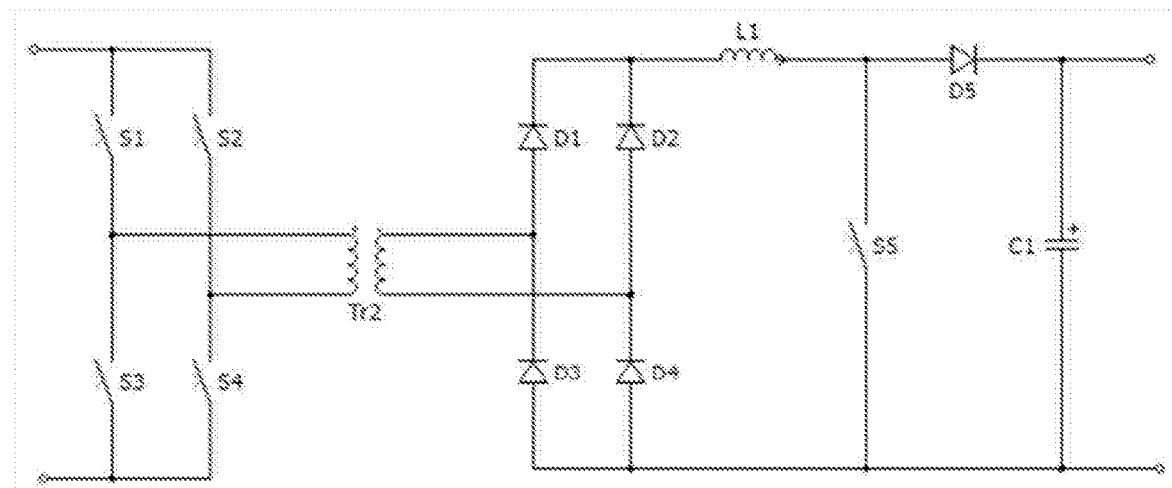
FIG. 2 another possible topology for implementing a galvanically isolated PFC.

FIG. 1 and FIG. 2 show possible topologies for implementing a galvanically isolated 3-phase PFC. These are only exemplary for a large number of possible topologies that include booster modules. In the topology of FIG. 1, there are three PFC boost inductors Tr0, Tr1, Tr2 having two coils each so that the PFC functionality and the galvanic isolation are realized in one and the same stage. So this topology includes three identical galvanically isolated PFC circuits. As far as this circuit is operated with 3-phase AC grid input, the output ripple will be small and a battery can be charged directly without an additional stage being cascaded to it.

The circuit of FIG. 2 obviously refers to one phase only, so for 3-phase operation three such PFC modules would be used.

In the circuits of FIG. 1 and FIG. 2 the output capacitor has a very small capacitance, since it is only there to suppress high-frequency noise, not to smoothen the output or charging voltage and/or current. No large electrolytic capacitor is required if three modules are used in 3-phase operation with their outputs in parallel.

The purpose of these two examples is to show some of many possible ways to implement a power converter that operates as a galvanically isolated 3-phase PFC that can be connected directly to a battery without an additional second stage.

Figure 3:
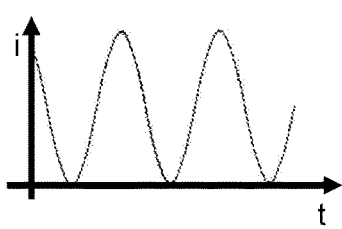
FIG. 3 an output current of a booster module in 1-phase operation.

A drawback of the topologies described in relation to FIG. 1 and FIG. 2 is that, in case they are operated in AC input 1-phase mode, their output current would have the waveform of a squared sinus curve, it would therefore have a ripple of 100%, as shown in FIG. 3.

FIG. 3 shows an output current of a booster module in 1-phase operation. The booster module acts as a resistive load to the input side 2, drawing a sinusoidal current that is in phase with the voltage at the input side 2. The power transferred by the PFC therefore follows a squared sine signal.

With a DC voltage at the output side 3, the power pulsation results in a current with also pulses at twice the AC input fundamental frequency.

Although most batteries would bear such a charging current, most OEMs will not accept it. In traditional solutions a large capacitor has to be used to flatten out the valleys of the ripple, and then the usage of a second stage after the PFC, i.e. of a DC-DC converter, would be once more unavoidable in order to further smoothen and control the charging current.

Figure 4:
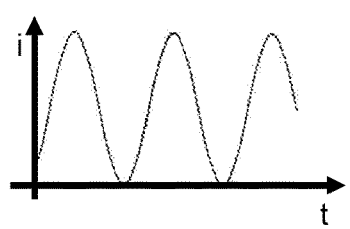
FIG. 4 an output current of a booster module for complementing the current of FIG. 3.

According to the present invention, the topology of the power converter 10 is modified to use the booster modules 11, 12, 13 in a different way. One of them is arranged to provide a first output current as in FIG. 3, and another one is arranged to provide a complementary output current that, when added to the first output current, leads to an at least approximately constant current, that is, a current with a minimal or negligible ripple. FIG. 4 shows such a complementary output current of a booster module for complementing the current of FIG. 3.

Figure 5:
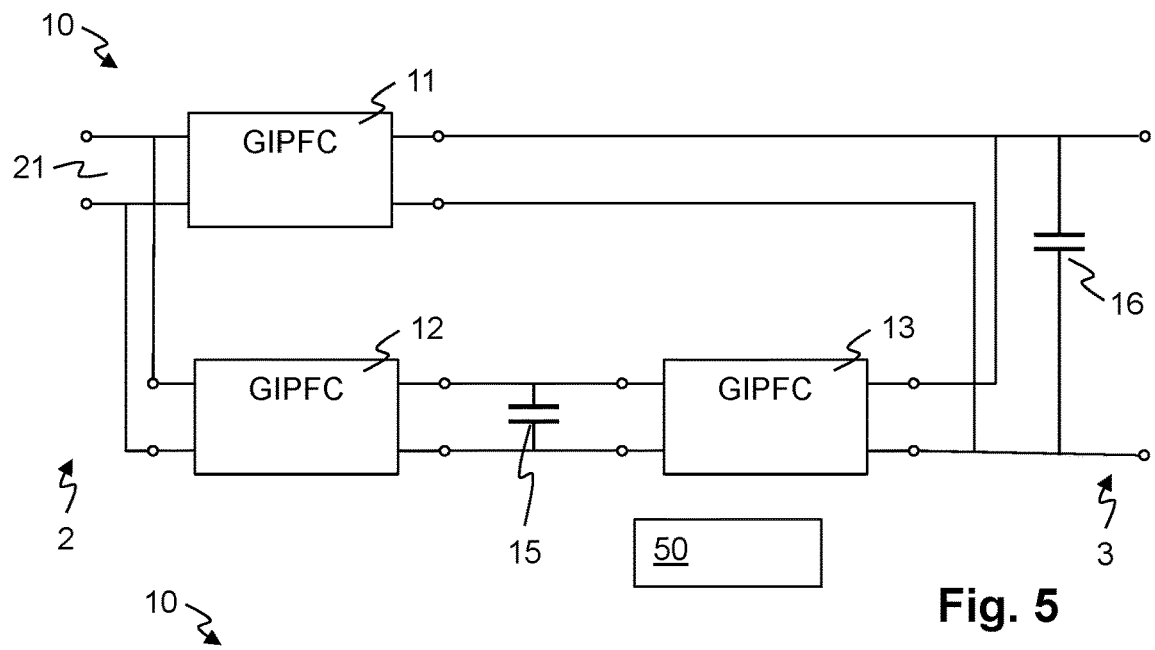
FIG. 5 a structure of a galvanically isolated power converter in a configuration for 1-phase operation.
Figure 6:
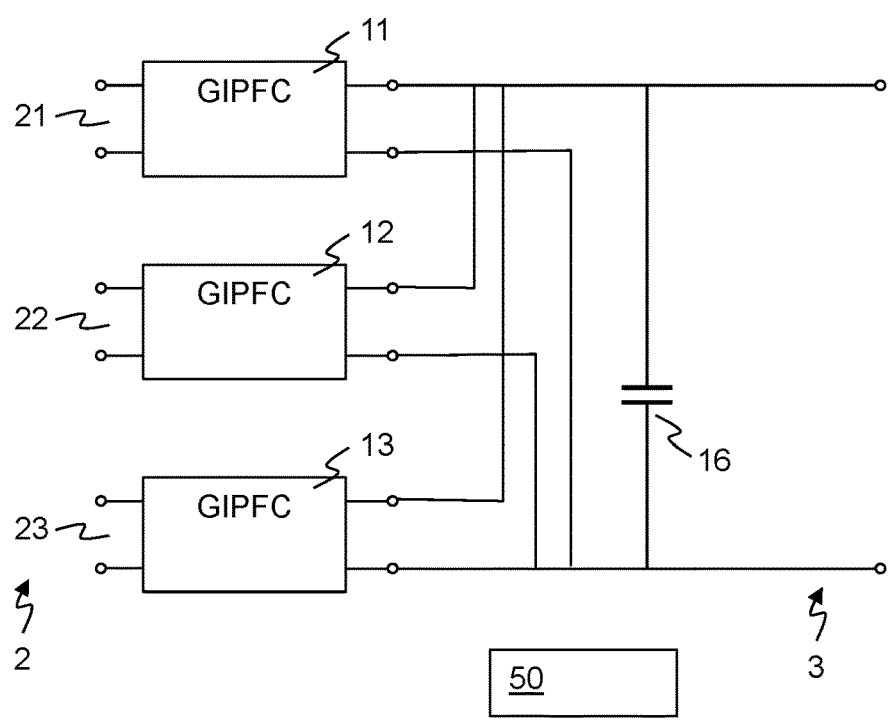
FIG. 6 a structure of the galvanically isolated power converter in a configuration for 3-phase operation.

FIG. 5 and FIG. 6 show two different configurations of a galvanically isolated reconfigurable power converter 10 including three booster modules, a first booster module 11, second booster module 12 and third booster module 13. The power converter 10 transfers power from an input side 2 to an output side 3. The input side 2, or AC side, includes one pair or three pairs of power converter input terminals, depending on the configuration. They can be connected to a first AC input phase 21 alone, or also to a second AC input phase 22 and third AC input phase 23, depending on the configuration. If there are three pairs of power converter input terminals, they can be connected in a Delta or a Star (or Y) configuration. The output side 3, or DC side, includes a pair of power converter output terminals. An output capacitor 16 is shown in parallel to the output side 3. The output capacitor 16 has a relatively small capacity since it will only have to filter out small imperfections of the output current and voltage, the circuits not being able to produce high frequency components. More specifically, its capacity is such that it blocks current components at twice the fundamental frequency of the AC frequency that the power converter is designed to operate at. Consequently, the output capacitor 16 does not exchange power and does not act for storing power at such frequencies.

Each booster module includes a module input and a module output. Each module input is constituted by a pair of respective input terminals. Each module output is constituted by a pair of respective output terminals.

A controller 50 is arranged to measure currents and/or voltages in the power converter 10 and to control the switches of the booster modules. It can also be arranged to control configuration switches—not illustrated—for reconfiguring the topology of the power converter 10.

FIG. 5 shows a structure of a galvanically isolated power converter in a configuration for 1-phase operation, for accomplishing the abovementioned addition of currents. The first booster module 11 is connected at its module input to the power converter input side 2 and at its module output to the output side 3. The second booster module 12 is connected at its module input to the input side 2 as well, in parallel to the first booster module 11, and at its module output to a buffer capacitor 15. The third booster module 13 is connected at its module input to the buffer capacitor 15 and at its module output to the power converter output side 3.

An upper branch with the first booster module 11 generates the first output current, as in FIG. 3. The lower branch including the second booster module 12 and third booster module 13 works as follows:

the second booster module 12 is controlled so that it absorbs a sinusoidal current from its input and charges the buffer capacitor 15, and the third booster module 13 is controlled so that it produces an output current with the complementary waveform of FIG. 4, discharging the buffer capacitor 15.

Ideally, the sum of the output currents of the first booster module 11 and third booster module 13 will be perfectly flat, i.e., without ripple.

The buffer capacitor 15 is dimensioned such that it is able to store just a sufficient amount of energy so that the third booster module 13 will be able to generate the complementary current without completely discharging it. The waveform of the voltage at the buffer capacitor 15 can have no matter how much ripple, which limits the ability of the third booster module 13 to about 80% to 95% of its nominal capability. Nevertheless, the capacity of the buffer capacitor 15 can be substantially smaller than the capacity needed in a traditional 2-stage converter. So the buffer capacitor 15 can be implemented not as a electrolyte capacitor, but rather, for example, as a film dielectric capacitor.

FIG. 6 shows a structure of the same galvanically isolated power converter in a configuration for 3-phase operation. The module inputs are connected to respective AC input phases 21, 22, 23. The module outputs are connected in parallel to the output side 3.

When charging a lithium-ion battery the charging current must be limited to a value such that the maximum charging voltage of the battery is not exceeded. This charging current limit, denoted as $I_{lim}$, is a function of the state of charge. With increasing state of charge, it decreases until it reaches zero at 100% state of charge.

Based on the charging current limit $I_{lim}$, a charging current set point value $I_{set}$, a maximum rated current of the charger $I_{max}$ and the mains configuration (single-phase or three-phase) under which the power converter 10 is operating, the PFC modules are either connected all three in parallel, as in FIG. 6, or two of them in series in parallel to the third, as in FIG. 5.

With three-phase mains, the PFC modules are always connected in parallel and the charging current is set to $\min(I_{lim}, I_{set})$.

With single-phase mains the PFC modules are configured in series if $2I_{set} > I_{lim}$ and $\frac{4}{3}I_{max} > I_{lim}$, otherwise they are connected in parallel.

Therefore, the charger can be operated with its maximum rated power both with single-phase and with three-phase mains using the parallel configuration.

Figure 7:
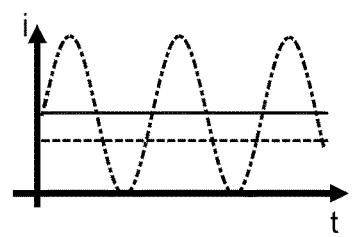
FIG. 7 charging currents for different configurations of the converter.

FIG. 7 shows a maximum charging current for the three-phase configuration (solid line), single phase parallel configuration (dashed line) and single-phase series configuration (dotted line) of the same power converter 10. Whereas the charging current is constant in three-phase operation (solid line) there is an inherent pulsation of the charging current in single-phase parallel configuration (dashed line). The AC component of this current can be useful for monitoring state of health and state of charge of the battery. If the peak of the pulsating charging current exceeds the charging current limit, however, the single-phase series configuration is used instead, resulting in a constant charging current which is limited to ⅔ of the rated value (dotted line).

While the invention has been described in present embodiments, it is distinctly understood that the invention is not limited thereto, but may be otherwise variously embodied and practised within the scope of the claims.

The invention claimed is:

1. A power converter for transferring power at least from an AC input side to a DC output side, the power converter comprising at least three booster modules including a first booster module, second booster module and third booster module, each of the at least three booster modules having a respective module input and a respective module output that are galvanically separated, each of the at least three booster modules being able to be operated as a power factor correction module, for drawing a sinusoidal current at its respective module input, wherein, in a configuration called series configuration:
the module input of the first booster module is connected to the AC input side, and the module output of the first booster module is connected to the DC output side for providing a first output current to the DC output side;
the module input of the second booster module is connected to the AC input side, and the module output of the second booster module is connected to a buffer capacitor for providing a second output current to the buffer capacitor; and
the module input of the third booster module is connected to the buffer capacitor and the module output of the third booster module is connected to the DC output side for providing a third output current to the DC output side.

2. The power converter of claim 1, wherein the at least three booster modules are free from a power storage element that is designed to smooth current pulses arising at twice a fundamental frequency of an AC source the power converter is designed to be connected to.

3. The power converter according to claim 1, wherein the at least three booster modules have similar or identical parameters.

4. The power converter according to claim 1, comprising a controller configured to:
control the first booster module to draw a first sinusoidal current at its input;
control the second booster module to draw a second sinusoidal current at its input;
control the third booster module to provide the third output current to complement the first output current so that a sum of the third and first output currents is at least approximately constant.

5. The power converter of claim 4, wherein the controller is configured to discharge the buffer capacitor to a voltage of less than 50% at each pulse of the third output current.

6. The power converter according to claim 1, comprising connections between the booster modules that can be switched, resulting in different topologies of the power converter, the power converter thereby being reconfigurable to a configuration, called three-phase parallel configuration, in which
the inputs of the three booster modules are separate from one another, and the outputs of the three booster modules are connected in parallel to the DC output side.

7. The power converter according to claim 1, comprising connections between the booster modules that can be switched, resulting in different topologies of the power converter, the power converter thereby being reconfigurable to a configuration, called single-phase parallel configuration, in which
the inputs of the three booster modules are connected in parallel to one another, and the outputs of the three booster modules are connected in parallel to the DC output side.

8. The power converter according to claim 6, comprising a controller configured to switch the connections between the booster modules, based on a charging current limit, a charging current set point value, a maximum rated current of the power converter and a mains configuration under which the power converter is operating,
to be connected in the three-phase parallel configuration in the case that the power converter is connected to a three-phase AC input side;
to be connected in the series configuration, in the case that the power converter is connected to a single-phase AC input side, and the charging current limit is less than two times the charging current set point value and the charging current limit is less than four thirds of the maximum rated current; and
to be connected in the single-phase parallel configuration otherwise.

9. A method for controlling a power converter according to claim 1, comprising the steps of
controlling the first booster module to draw a first sinusoidal current at its input;
controlling the second booster module to draw a second sinusoidal current at its input;
controlling the third booster module to provide the third output current to complement the first output current so that a sum of the third and first output currents is at least approximately constant.

10. The method for controlling a power converter according to claim 9, comprising the steps of switching connections between the booster modules, based on a charging current limit, a charging current set point value, a maximum rated current of the power converter and a mains configuration under which the power converter is operating,
to be connected in the three-phase parallel configuration in the case that the power converter is connected to a three-phase AC input side;
to be connected in the series configuration, in the case that the power converter is connected to a single-phase AC input side, and the charging current limit is less than two times the charging current set point value and the charging current limit is less than four thirds of the maximum rated current; and
to be connected in the single-phase parallel configuration otherwise.

11. The power converter according to claim 7, comprising a controller configured to switch the connections between the booster modules, based on a charging current limit, a charging current set point value, a maximum rated current of the power converter and a mains configuration under which the power converter is operating,
to be connected in the three-phase parallel configuration in the case that the power converter is connected to a three-phase AC input side;
to be connected in the series configuration, in the case that the power converter is connected to a single-phase AC input side, and the charging current limit is less than two times the charging current set point value and the charging current limit is less than four thirds of the maximum rated current; and to be connected in the single-phase parallel configuration otherwise.

* * * * *